United States Patent
Bumiller (10) Patent No.: US 8,249,628 B2
(45) Date of Patent: Aug. 21, 2012

(54) METHOD, SYSTEM AND APPARATUS FOR ALTERNATE DATA SERVICE PROVISIONING

(75) Inventor: George Baldwin Bumiller, Ramsey, NJ (US)

(73) Assignee: Research In Motion Limited, Waterloo (CA)

( * ) Notice: Subject to any disclaimer, the term of this patent is extended or adjusted under 35 U.S.C. 154(b) by 460 days.

(21) Appl. No.: 11/593,436

(22) Filed: Nov. 6, 2006

(65) Prior Publication Data

US 2008/0108362 A1    May 8, 2008

(51) Int. Cl.
*H04W 4/00* (2009.01)

(52) U.S. Cl. ........ 455/466; 455/428; 455/434; 455/445; 455/426.1

(58) Field of Classification Search .................. 455/435, 455/466, 432, 434, 445, 426.1, 428, 33.1; 702/187, 186; 709/223
See application file for complete search history.

(56) References Cited

U.S. PATENT DOCUMENTS

| | | | | |
|---|---|---|---|---|
| 5,708,656 | A * | 1/1998 | Noneman et al. | 370/335 |
| 6,654,360 | B1 * | 11/2003 | Abrol | 370/329 |
| 7,069,008 | B1 * | 6/2006 | Hill et al. | 455/434 |
| 2002/0069037 | A1 * | 6/2002 | Hendrickson et al. | 702/186 |
| 2004/0103191 | A1 * | 5/2004 | Larsson | 709/224 |
| 2005/0037755 | A1 * | 2/2005 | Hind et al. | 455/435.3 |
| 2005/0197142 | A1 * | 9/2005 | Major | 455/466 |
| 2006/0172737 | A1 | 8/2006 | Hind et al. | |

FOREIGN PATENT DOCUMENTS

| | | |
|---|---|---|
| EP | 1 569 395 A1 | 2/2004 |
| WO | 98/10617 | 3/1998 |
| WO | 99/49690 | 9/1999 |
| WO | 01/47316 A2 | 6/2001 |

OTHER PUBLICATIONS

European Examination Report in EP Application No. 06123550.3; European Patent Office; Dec. 19, 2008; 5 pages.
European Search Report; European Patent Office; Oct. 10, 2007; 10 pages.
Canadian Office Action for Application No. 2609941; Canadian intellectual Property Office; Apr. 21, 2009; 2 pages.
Canadian Office Action for Application No. 2609941; Canadian intellectual Property Office; Nov. 8, 2010; 2 Pages.

* cited by examiner

*Primary Examiner* — Kamran Afshar
*Assistant Examiner* — Manpreet Matharu
(74) *Attorney, Agent, or Firm* — The Danamraj Law Group, P.C.

(57) ABSTRACT

A method, system and apparatus for providing an alternate data service to a mobile communication device. The apparatus includes a logic module operable to identify a wireless network accessible by the mobile communication device, a logic module operable to determine whether a packet data service is available to the mobile communication device via the wireless network and a logic module operable to effectuate an alternate data service when the packet data service is unavailable to the mobile communication device via the wireless network.

16 Claims, 7 Drawing Sheets

METHOD, SYSTEM AND APPARATUS FOR ALTERNATE DATA SERVICE PROVISIONING

TECHNICAL FIELD OF THE APPLICATION

The present disclosure generally relates to wireless packet data service networks. More particularly, and not by way of any limitation, the present disclosure is directed to a mobile communication device and related data service network employing a method, apparatus and system for providing an alternate data service to the mobile communication device.

BACKGROUND

The present disclosure is directed toward the provisioning and management of wireless data service with respect to a mobile communication device. When it is available, a mobile communication device will generally use packet data service for communication of packetized data. This data may include, for example, electronic messages and periodic updates to Personal Information Manager (PIM) data, but could potentially include a number of types of non-voice and voice data communications between a mobile communication device and the outside world. An example of packet data service is GPRS, but other packet data service networks are employed for such purposes.

BRIEF DESCRIPTION OF THE DRAWINGS

A more complete understanding of the embodiments of the present disclosure may be had by reference to the following Detailed Description when taken in conjunction with the accompanying drawings wherein.

DETAILED DESCRIPTION OF THE DRAWINGS

A system, method, and apparatus of the present disclosure will now be described with reference to various examples of how the embodiments can best be made and used. Identical reference numerals are used throughout the description and several views of the drawings to indicate identical or corresponding parts, wherein the various elements are not necessarily drawn to scale.

The present disclosure relates to an apparatus, method and system for providing an alternate data service with respect to a mobile communication device. According to a first aspect, the present disclosure relates to a method of provisioning data service to a mobile communication device. The method includes identifying a wireless network accessible by the mobile communication device; determining whether a packet data service is available to the mobile communication device via the wireless network; and configuring the mobile communication device to use an alternate data service when the packet data service is unavailable to the mobile communication device via the wireless network.

In certain embodiments, the method includes automatically upgrading to packet data service if packet data service becomes available. In certain embodiments, the method includes modifying of data transfer characteristics depending on whether communication is occurring via packet data service or alternate data service. In certain embodiments, the method includes providing the alternate using Unstructured Supplementary Services Data (USSD) messaging. In certain embodiments, the method includes providing a notice from the mobile communication device to a relay node that packet data service is currently unavailable. In certain embodiments, the method includes gathering operating statistics relating to usage of packet data service and alternate data service. In certain embodiments, the method includes activating the alternate data service over an additional wireless network accessible to the mobile communication device.

According to a second aspect, the present disclosure relates to a system for provisioning data service to a mobile communication device. The system includes means for determining whether a packet data service is available to the mobile communication device via a wireless network and means for effectuating service logic in the mobile communication device for facilitating an alternate data service when the packet data service is unavailable to the mobile communication device via the wireless network.

According to a third aspect, the present disclosure relates to a mobile communication device comprising a logic module operable to identify a wireless network accessible by the mobile communication device; a logic module operable to determine whether a packet data service is available to the mobile communication device via the wireless network; and a logic module operable to effectuate an alternate data service when the packet data service is unavailable to the mobile communication device via the wireless network.

According to a fourth aspect, the present disclosure relates to a network node for facilitating data service to a mobile communication device disposed within a local wireless network. The network node comprises a packet data server operable to provide data to the mobile communication device via a packet data service whenever the packet data service is available via the local wireless network and an alternate data server operable to provide data to the mobile communication device via an alternate data service whenever the packet data service is unavailable via the local wireless network.

Figure 1A:
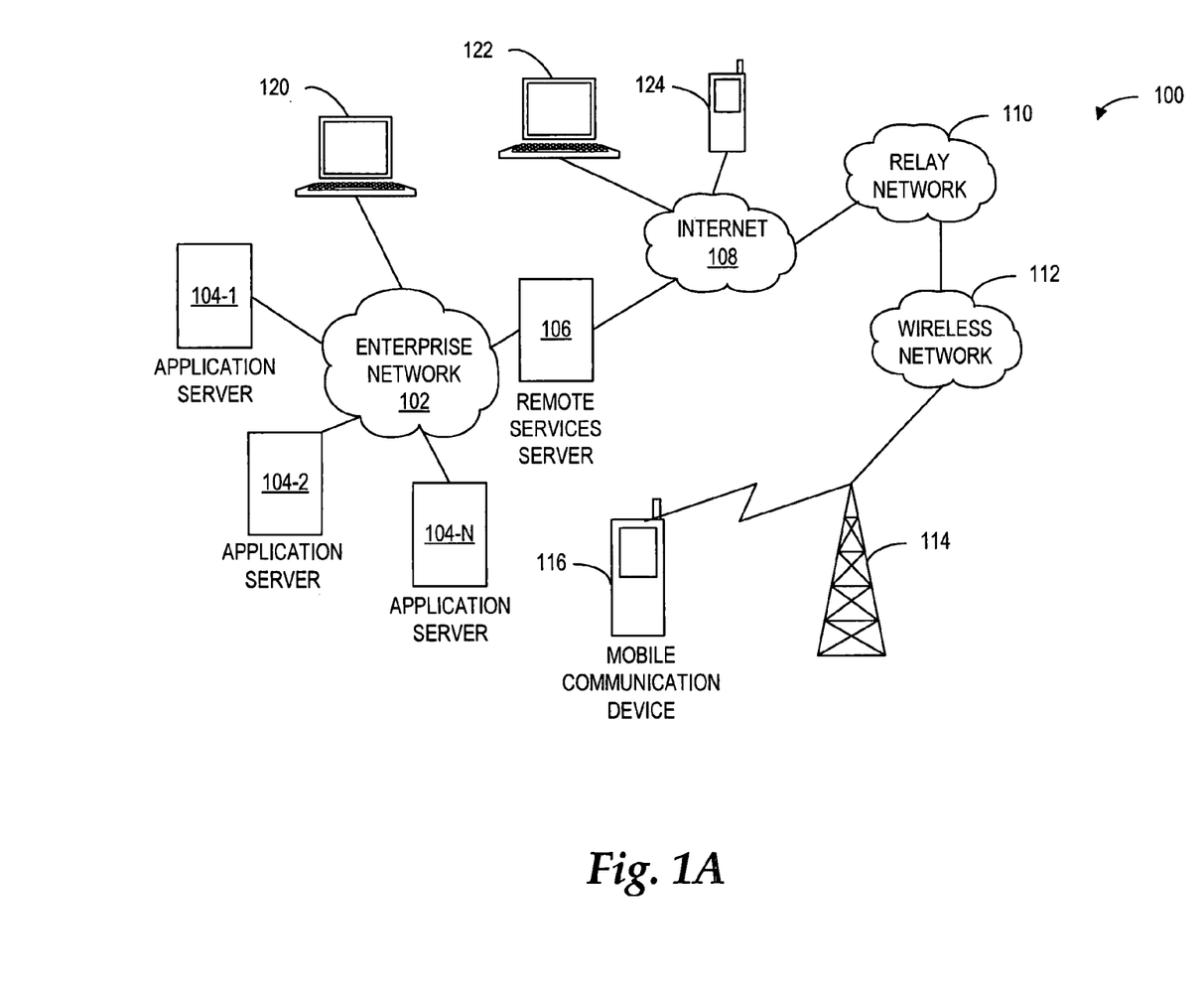
FIG. 1A depicts an exemplary network environment including a wireless service network wherein an embodiment of the present disclosure may be practiced.

Referring now to the drawings, and more particularly to FIG. 1A, depicted therein is an exemplary network environment 100 including a wireless data service network 112 wherein an embodiment of the present system may be practiced. An enterprise network 102, which may be a packet-switched network, can include one or more geographic sites and be organized as a local area network (LAN), wide area network (WAN) or metropolitan area network (MAN), et cetera, for serving a plurality of corporate users.

A number of application servers 104-1 through 104-N disposed as part of the enterprise network 102 are operable to provide or effectuate a host of internal and external services such as email, video mail, Internet access, corporate data access, messaging, calendaring and scheduling, information management, and the like. Accordingly, a diverse array of personal information appliances such as desktop computers, laptop computers, palmtop computers, et cetera, although not specifically shown in FIG. 1A, may be operably networked to one or more of the application servers 104-i, i=1, 2, . . . , N, with respect to the services supported in the enterprise network 102.

Additionally, a remote services server 106 may be interfaced with the enterprise network 102 for enabling a corporate user to access or effectuate any of the services from a remote location using a suitable mobile communication device 116. A secure communication link with end-to-end encryption may be established that is mediated through an external IP network, i.e., a public packet-switched network such as the Internet 108, as well as the wireless packet data service network 112 operable with mobile communication device 116 via suitable wireless network infrastructure that includes a base station (BS) 114. In one embodiment, a trusted relay network 110 may be disposed between the Internet 108 and the infrastructure of wireless service network 112. Those of skill in the art will appreciate that relay network 110 may comprise a single relay node 404 or may comprise a plurality of interconnected relay nodes. Alternatively, the functionality of the trusted relay network 110 may be integrated within the infrastructure of wireless network 112. By way of example, mobile communication device 116 may be a data-enabled handheld device capable of receiving and sending messages, web browsing, interfacing with corporate application servers, et cetera.

For purposes of the present disclosure, the wireless service network 112 may be implemented in any known or heretofore unknown mobile communications technologies and network protocols. For instance, the wireless service network 112 may be comprised of a General Packet Radio Service (GPRS) network that provides a packet radio access for mobile devices using the cellular infrastructure of a Global System for Mobile Communications (GSM)-based carrier network. In other implementations, the wireless service network 112 may comprise an Enhanced Data Rates for GSM Evolution (EDGE) network, an Integrated Digital Enhanced Network (iDEN), a Code Division Multiple Access (CDMA) network, a High Speed Downlink Packet Access (HSDPA) network or any 3rd Generation (3G) network. By way of providing an exemplary embodiment, the teachings of the present disclosure will be illustrated with a GPRS-based carrier network, although those skilled in the art should readily recognize that the scope of the present disclosure is not limited thereby.

A single desktop computer 122 and mobile communication device 124 are shown connected to internet 108 for purposes of illustration. Those of skill in the art will appreciate that millions of devices are in fact connected to the internet 108, as discussed above with respect to enterprise network 102. These include, but are not limited to, desktop computers, laptop computers, palmtop computers, cellular telephones, personal digital assistants and other mobile communication devices.

Figure 1B:
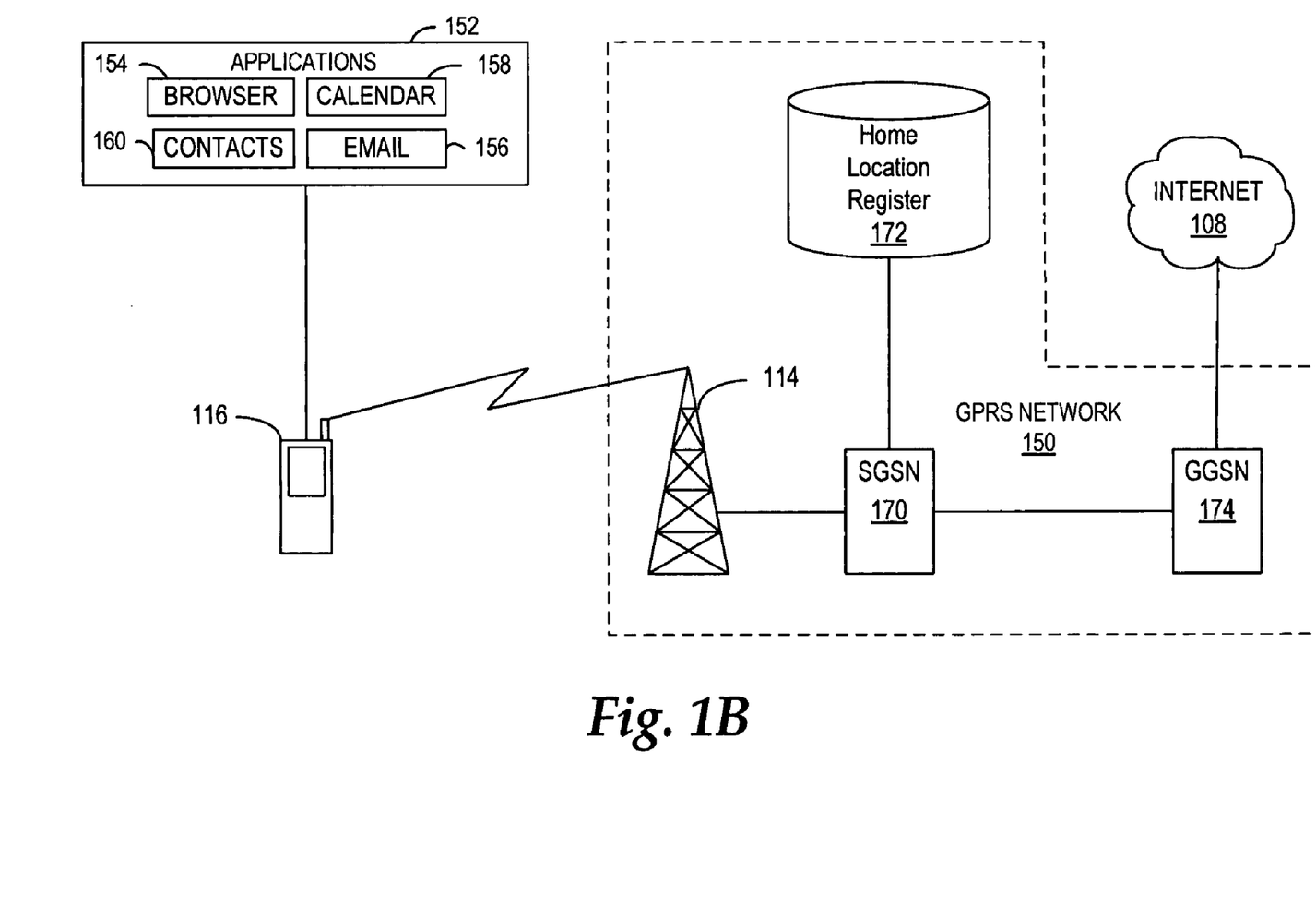
FIG. 1B depicts a detail view of an exemplary network environment wherein an embodiment of the present disclosure may be practiced.

FIG. 1B depicts additional details of an exemplary wireless service network operable with a mobile communication device in accordance with one embodiment. As illustrated, reference numeral 150 refers to a GPRS network operable as the wireless packet data service network with respect to mobile communication device 116 that is provided with a number of data-centric user applications 152 such as, e.g., web browsing 154, email 156, calendar 158, contacts 160. As noted above, base station 114 serves mobile communication device 116 via the air interface using applicable radio layer protocols. As is well known, GPRS uses a packet-switching technique to transfer both high-speed and low-speed data and signaling in an efficient manner over GSM radio networks. Packet switching means that GPRS radio resources are used only when users are actually sending or receiving data. Rather than dedicating a radio channel to a mobile data user, e.g., mobile communication device 116, for a fixed period of time, the available radio channels can be concurrently shared between several users. Therefore, GPRS is designed to support from intermittent and bursty data transfers (e.g., web browsing) to occasional transmission of large volumes of data (e.g., FTP). Allocation of GPRS radio channels can be flexible: from 1 to 8 radio interface timeslots can be allocated per one Time Division Multiple Access (TDMA) frame. Typically, timeslots are shared by the active users, and uplinks and downlinks are allocated separately. Various radio channel coding schemes are available to allow a range of data bit transfer rates.

Two additional network nodes are provided within a GSM network in order to implement a packet-switched data transfer service. A Serving GPRS Support Node (SGSN) 170, which is coupled to a Home Location Register (HLR) 172 and disposed at the same hierarchical level as a Mobile Switching Center (MSC) of the circuit-switched cellular network (not shown), is operably coupled to base station 114 and keeps track of the location of a GPRS user such as the user of mobile communication device 116. Further, SGSN 170 is responsible for performing security functions and handling access control with respect to mobile communication device 116. A Gateway GPRS Support Node (GGSN) 174 provides interworking with the internet 108, and is operably coupled to one or more SGSNs, e.g., SGSN 170, via an IP-based GPRS backbone network.

In order to access the packet data service, mobile communication device 116 makes its presence known to the network by performing what is known as a GPRS Attach. Thereafter, to send and receive packet data, mobile communication device 116 activates the packet data address that it wants to use. This operation renders mobile communication device 116 "visible" in the corresponding GGSN, and interworking with external data networks can then begin. User data is transferred transparently between mobile communication device 116 and the external data networks with a method known as encapsulation and tunneling wherein data packets are equipped with GPRS-specific protocol information and transferred transparently between mobile communication device 116 and GGSN 174.

Figure 2:
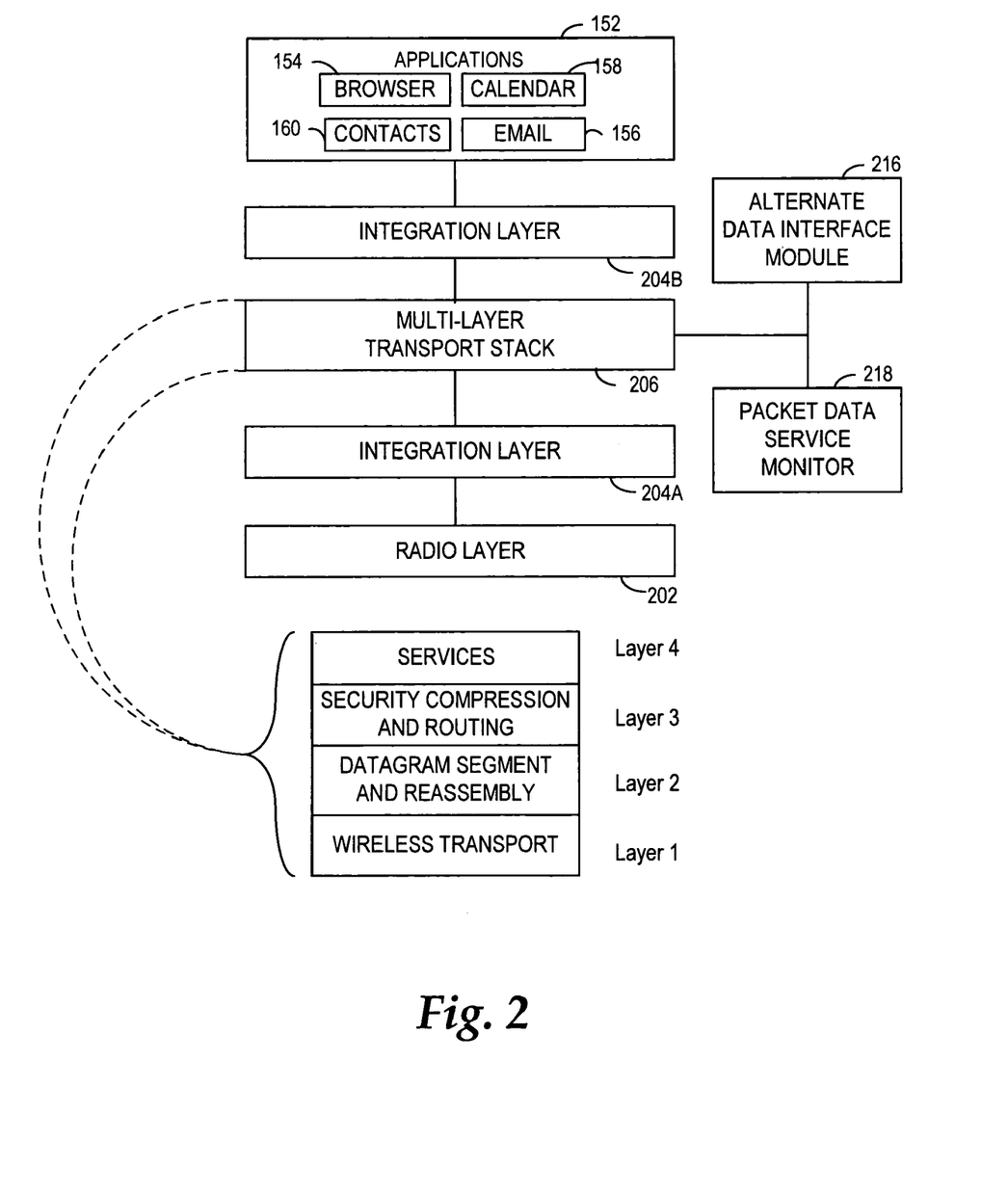
FIG. 2 depicts a software architectural view of a mobile communication device operable to communicate within a wireless service network according to one embodiment.

FIG. 2 depicts a software architectural view of a mobile communication device according to one embodiment. A multi-layer transport stack (TS) 206 is operable to provide a generic data transport protocol for any type of corporate data, including email, via a reliable, secure and seamless continuous connection to a wireless service network. As illustrated in this embodiment, an integration layer 204A is operable as an interface between the radio layer 202 and the transport stack 206 of mobile communication device 116. Likewise, another integration layer 204B is provided for interfacing between the transport stack 206 and the user applications 152 supported on the mobile communication device 116, e.g., email 156, calendar/scheduler 158, contact management 160 and browser 154. Although not specifically shown, the transport stack 206 may also be interfaced with the operating system of mobile communication device 116. In another implementation, the transport stack 206 may be provided as part of a data communications client module operable as a host-independent virtual machine on a mobile device. An alternate data interface module 216 and a packet data service monitor 218 are operably connected to transport stack 206. Alternate data interface module 216 and packet data service monitor 218 work in concert to identify when packet data service is unavailable to mobile communication device 116 and to provide an alternate data service to mobile communication device 116 when such unavailability occurs. The manner of operation of alternate data service module 216 and packet data service monitor 218 are discussed in further detail below.

The bottom layer (Layer 1) of the transport stack 206 is operable as an interface to the wireless network's packet layer. Layer 1 handles basic service coordination within the exemplary network environment 100 shown in FIG. 1A. For example, when a mobile communication device roams from one carrier network to another, Layer 1 verifies that the packets are relayed to the appropriate wireless network and that any packets that are pending from the previous network are rerouted to the current network. The top layer (Layer 4) exposes various application interfaces to the services supported on the mobile communication device. The remaining two layers of the transport stack 206, Layer 2 and Layer 3, are responsible for datagram segmentation/reassembly and security, compression and routing, respectively.

Figure 3:
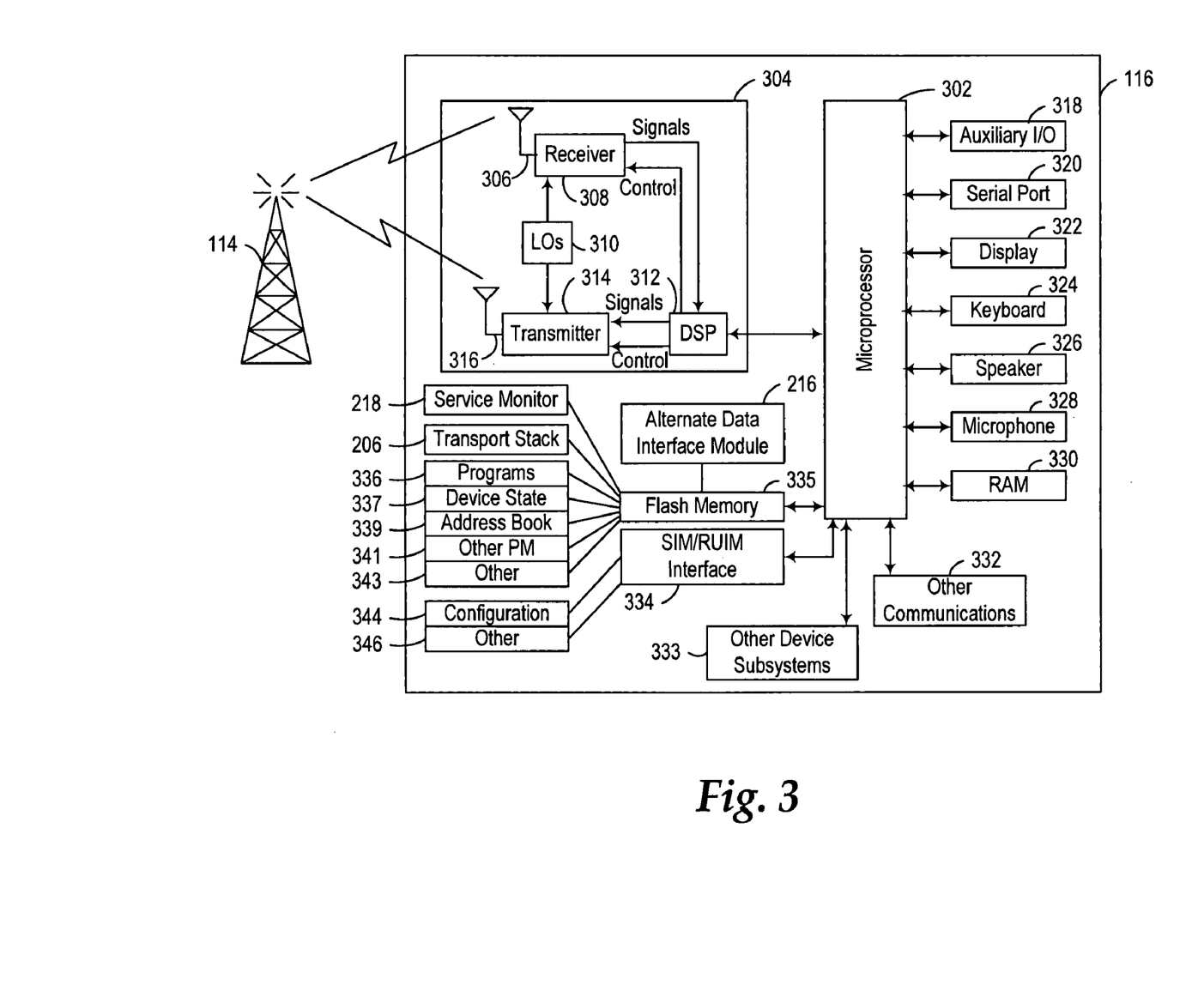
FIG. 3 depicts a block diagram of a mobile communication device operable to communicate within a wireless service network according to one embodiment.

FIG. 3 depicts a block diagram of a mobile communication device according to one embodiment. It will be recognized by those skilled in the art upon reference hereto that although an embodiment of mobile communication device 116 may comprise an arrangement similar to one shown in FIG. 3, there can be a number of variations and modifications, in hardware, software or firmware, with respect to the various modules depicted. Accordingly, the arrangement of FIG. 3 should be taken as illustrative rather than limiting with respect to the embodiments of the present disclosure.

A microprocessor 302 providing for the overall control of an embodiment of mobile communication device 116 is operably coupled to a communication subsystem 304 which includes a receiver 308 and transmitter 314 as well as associated components such as one or more local oscillator (LO) modules 310 and a processing module such as a digital signal processor 312. As will be apparent to those skilled in the field of communications, the particular design of the communication module 304 may be dependent upon the communications network with which the mobile communication device 116 is intended to operate.

In one embodiment, the communication module 304 is operable with both voice and data communications. Regardless of the particular design, however, signals received by antenna 306 through base station 114 are provided to receiver 308, which may perform such common receiver functions as signal amplification, frequency down conversion, filtering, channel selection, analog-to-digital (A/D) conversion, and the like. Similarly, signals to be transmitted are processed, including modulation and encoding, for example, by digital signal processor 312, and provided to transmitter 314 for digital-to-analog (D/A) conversion, frequency up conversion, filtering, amplification and transmission over the air-radio interface via antenna 316.

Microprocessor 302 also interfaces with further device subsystems such as auxiliary input/output (I/O) 318, serial port 320, display 322, keyboard 324, speaker 326, microphone 328, random access memory (RAM) 330, a short-range communications subsystem 332, and any other device subsystems generally labeled as reference numeral 333. To control access, a Subscriber Identity Module (SIM) or Removable User Identity Module (RUIM) interface 334 is also provided in communication with the microprocessor 302.

In one implementation, SIM/RUIM interface 334 is operable with a SIM/RUIM card having a number of key configurations 344 and other information 346 such as identification and subscriber-related data. Operating system software and transport stack software may be embodied in a persistent storage module (i.e., non-volatile storage) such as Flash memory 335. In one implementation, flash memory 335 may be segregated into different areas, e.g., storage area for computer programs 336 as well as data storage regions such as device state 337, address book 339, other personal information manager (PIM) data 341, and other data storage areas generally labeled as reference numeral 343. Alternate data interface module 216 and packet data service monitor 218 are also shown disposed within flash memory 335, although those of skill in the art will appreciate that alternate data service module 216 and packet data service monitor 218 may be disposed elsewhere within mobile communication device 116.

Figure 4:
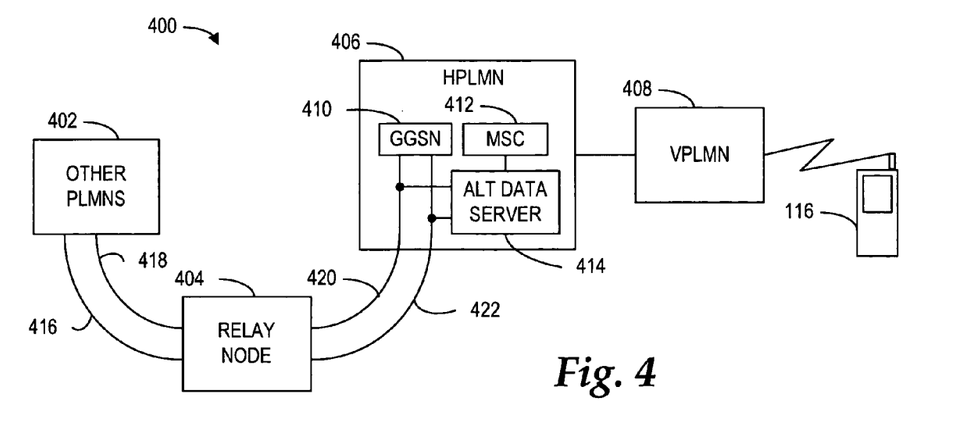
FIG. 4 depicts a schematic view of a wireless network operable to provide alternate data service according to one embodiment.

FIG. 4 depicts a data network 400 operable to provide alternate data service to a mobile communication device. The alternate data service employed may vary from one embodiment to another. By way of example, the foregoing discussion relates to the use of Unstructured Supplementary Services Data (USSD) as an alternate data service, but those of skill in the art will appreciate that other services may be employed for the same purpose. This figure shows the elements and information paths which are used by the alternate data service, in this case USSD, when packet data service is not available to mobile communication device 116. Mobile communication device 116 is operable with a group of remote PLMNs 402 via the data network 400, which includes a relay node 404, Home PLMN (HPLMN) 406 and Visited PLMN (VPLMN) 408. HPLMN 406 incorporates GGSN 410, MSC 412 and alternate data service server 414, which may be a USSD server. Note that a USSD server may have other uses, such as responding to inquiries from the mobile communication device on the number of subscribed minutes remaining, or adding to the minutes remaining, etc. Remote PLMNs 402 are connected to relay node 404 via a pair of separate channels 416, 418, so as to provide greater reliability by redundancy. HPLMN 406 is connected to the relay node 404 through use of two separate channels 420, 422 for the same reason. It should be recognized, however, that in an alternate embodiment, relay node 404 may be intergrated within a PLMN, which may be an HPLMN, VPLMN or remote PLMN. Within the HPLMN 406, there are different points of attachment, depending on whether packet data links or alternate data links are used to connect to mobile communication device 116. A hub or other device, disposed at the PLMN end of each of the data channels 420, 422 to the relay node 404, may be used to enable both alternate data service traffic and packet data channel-generated traffic to be carried over the same channel to and from the relay node 404.

There are a number of possible reasons why packet data service may not be available to a mobile communication device 116 in a given location. The wireless networks providing service to that location may not incorporate packet data service in any form. Even where packet data service is provided to a location, it may not be available to mobile communication device 116 owing to the absence of a service level agreement between a subscriber's service provider and any of the local wireless networks providing packet data service to the area. The type of alternate data service employed may vary from one application to another and from one location to another. In one embodiment, USSD may be employed as an alternate data service where mobile devices and PLMNs incorporate USSD capability. The USSD service between mobile communication device 116 and a PLMN has a peak data rate of about 600 b/s outside of voice call or 1000 b/s with a voice call. It is, therefore, slower than a packet connection.

In certain applications, it is possible that the alternate data server within the PLMN may limit the size of alternate data messages. It may, therefore, be appropriate to closely manage the services that are provided when an alternate data service links mobile communication device 116 and relay node 404. This management may include limiting block size in the data transmissions to and from mobile communication device 116, deferring transmission of attachments or large attachments to or from mobile communication device 116, deferring provision of browsing capability, restrictions on the synchronization of data, blocking user-generated messages while an alternate data session with mobile communication device 116 is in progress.

Figure 5:
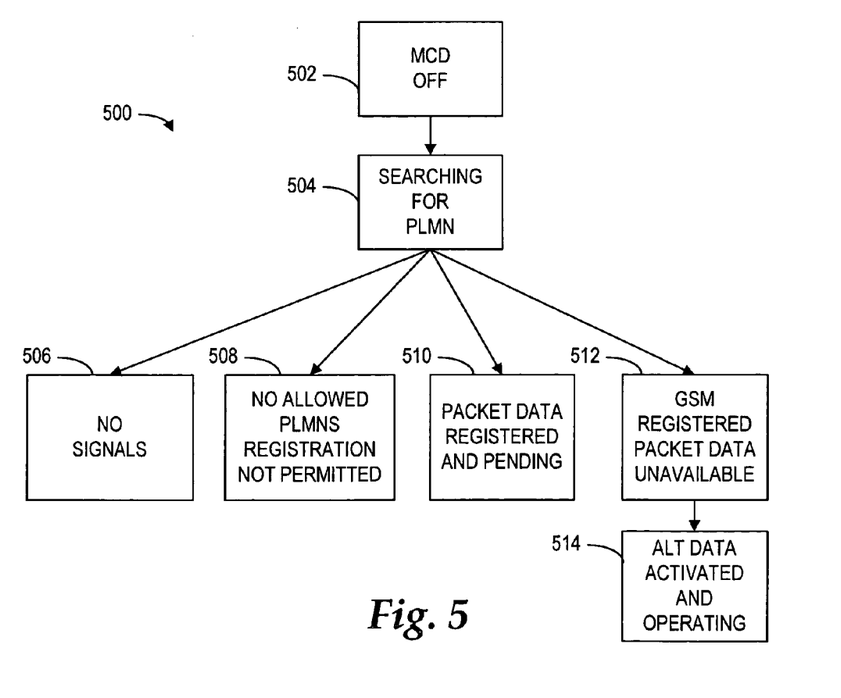
FIG. 5 depicts a state diagram illustrating alternate data service provisioning states according to one embodiment.

FIG. 5 depicts a state diagram 500 illustrating the various states within which mobile communication device 116 may be configured according to the present disclosure. In state 502, mobile communication device 116 is powered off or is otherwise not in communication with wireless network 112 for some reason, such as that communication subsystem 304 is turned off. When powered on (state 504), mobile communication device 116 will scan the several frequency bands that it is capable of operating in, search for a Public Land Mobile Network (PLMN), and attempt to register on an appropriate PLMN. It is possible that there are no signals available to mobile communication device 116 (state 506). Alternately, there may be signals available, but no allowed PLMNs available (state 508). If mobile communication device 116 is able to identify an allowed PLMN, it will register on GSM, as a mobile for GSM voice service and other GSM services. GSM does not provide packet data service, so mobile communication device 116 will attempt to register on the selected PLMN's packet system. This may be, for example, GPRS, EDGE or HSDPA. If mobile communication device 116 is successful in registering on its Home PLMN (HPLMN), it will be provided with a PDP context (state 510). Mobile communication device 116 will then have a packet data connection through the PLMN's infrastructure to the link connecting the PLMN to a trusted node. If mobile communication device 116 registers on a PLMN which is not its HPLMN, but is a visited PLMN (VPLMN), that PLMN will provide a connection from mobile communication device 116 to the HPLMN, and then through the HPLMN to the trusted node.

In the event that mobile communication device 116 is able to identify an allowed PLMN, but packet data is not available (state 512), mobile communication device 116 will attempt to identify an alternate data service. If mobile communication device 116 is able to identify a suitable alternate data service, that alternate data service will be activated (state 514). In this state, mobile communication device 116 will have data service, but it may have a lower bandwidth and a generally lower level of service as compared to packet data service. Accordingly, packet data service is generally considered the preferred data service within a PLMN and will be employed whenever available. The alternate data service will generally only be employed when packet data service is not available.

Figure 6:
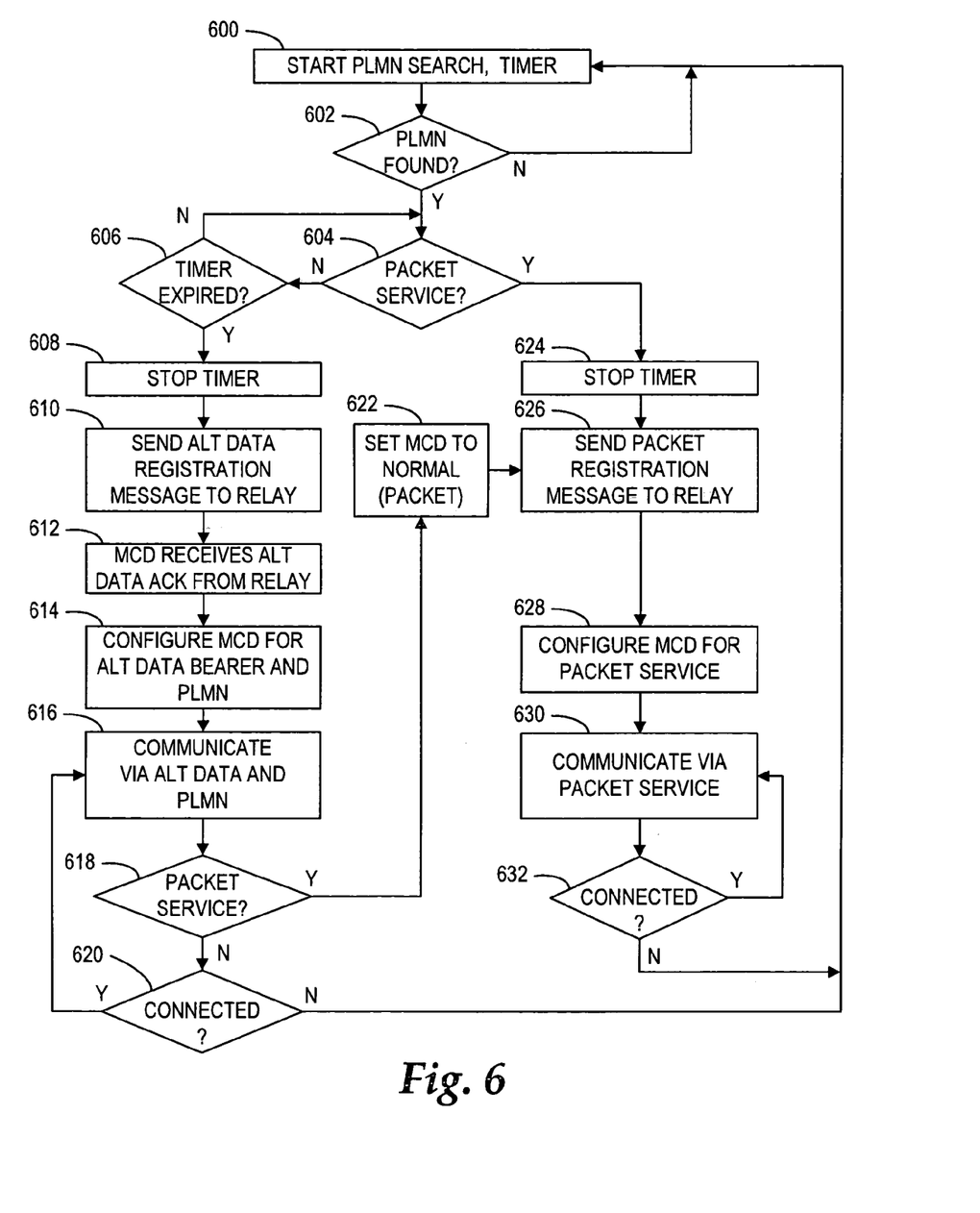
FIG. 6 depicts a flow chart illustrating alternate data service provisioning according to one embodiment.

FIG. 6 is a flow chart depicting a method of provisioning a mobile communication device 116 for alternate data service according to one embodiment. Process flow begins in block 600, where a PLMN search is initiated and a timer reset. Process flow from decision block 602 depends on whether an allowable PLMN has been identified. If an allowable PLMN has not been identified, process flow returns to block 600. If an allowable PLMN has been identified, process flow proceeds to block 604. Process flow from block 604 depends on whether packet data service has been established. If packet data service has been established, process flow proceeds to block 624. If packet data service has not been established, process flow proceeds to block 606.

Process flow from block 606 depends on whether the timer, which was reset in block 602, has expired. If the timer has not expired, process flow returns to block 604. If the timer has expired, process flow proceeds to block 608, where the timer is stopped, and then on to block 610.

In block 610, mobile communication device 116 sends an alternate data registration message to relay node 404, and process flow proceeds to block 612, where mobile communication device 116 receives an alternate data acknowledgment from relay node 404, and then proceeds to block 614. In block 614, mobile communication device 116 is configured for alternate data service and the identified PLMN, after which process flow proceeds to block 616.

In block 616, mobile communication device 116 communicates via the alternate data service and the identified PLMN. Periodically, mobile communication device 116 will check whether packet service has become available, as represented by block 618. If packet data service has become available, process flow diverts to block 622, in which mobile communication device 116 is configured for packet data service, and then proceeds to block 626. If packet service is not available, process flow proceeds to block 620, in which suitable service logic provisioned in mobile communication device 116 determines whether mobile communication device 116 is still connected to the PLMN. If mobile communication device 116 remains connected, process flow returns to block 616, where communication continues. If mobile communication device 116 has become disconnected, process flow returns to block 600.

When mobile communication device 116 determines that packet service is available, process flow proceeds through blocks 624 through 632. In block 624, the timer reset in block 600 is stopped. In block 626, mobile communication device 116 sends a packet data registration message to relay node 404. In block 628, mobile communication device 116 is configured for packet data service. In block 630, mobile communication device 116 communicates via packet service. Decision block 632 determines whether mobile communication device 116 remains connected to the PLMN. If mobile communication device 116 remains connected, process flow returns to block 630, where communication continues. If mobile communication device 116 has lost its connection with the identified PLMN, process flow returns to 600, where mobile communication device 116 searches for another PLMN.

Figure 7:
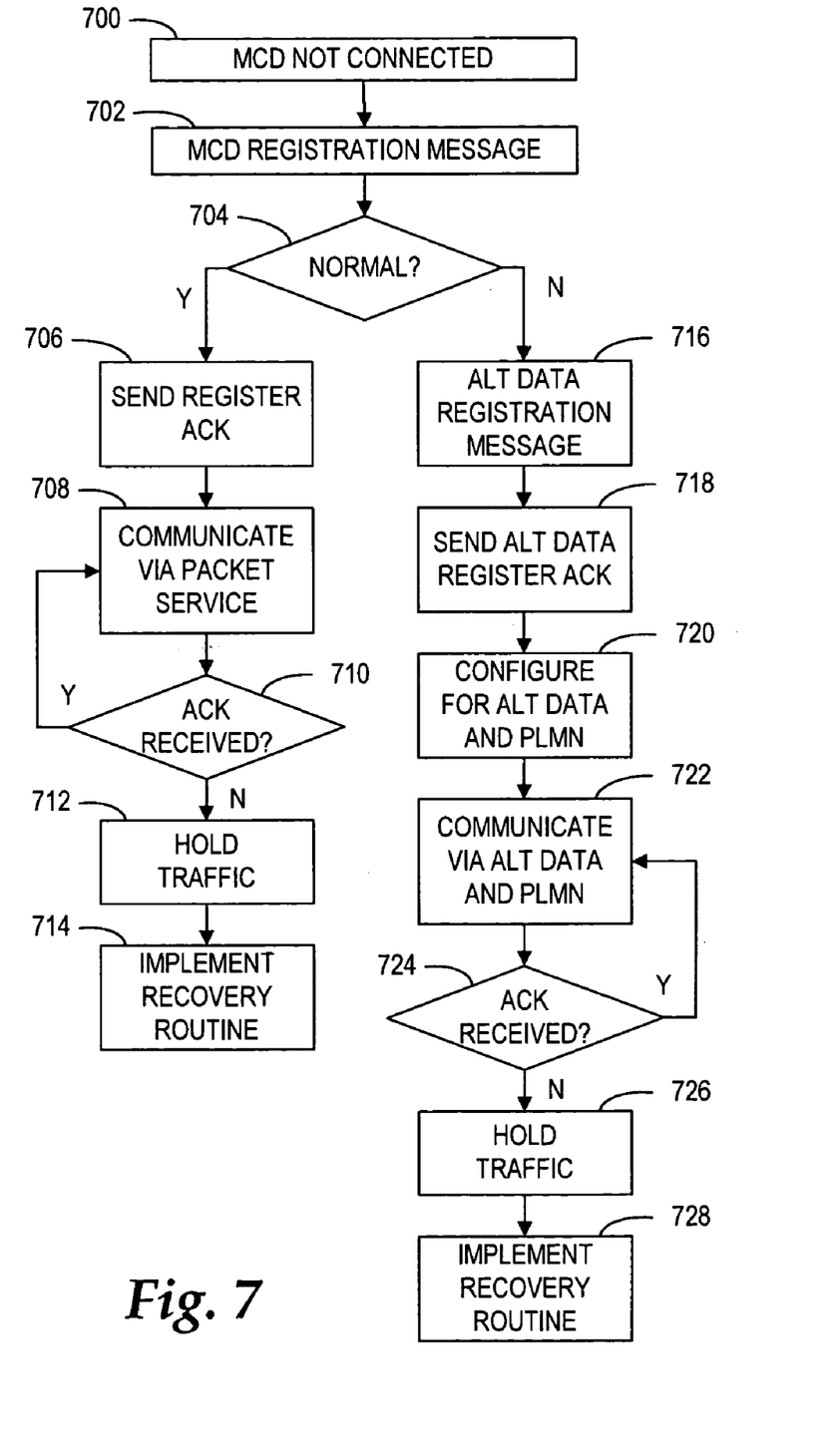
FIG. 7 depicts a flow chart illustrating alternate data service provisioning according to one embodiment.

FIG. 7 is a flow chart depicting normal packet process flow and alternate data process flow. Process flow begins in block 700, at which point mobile communication device 116 is not connected to data service. In block 702, a registration message is sent from mobile communication device 116 to relay node 404. Process flow from block 704 depends on whether the message indicates the availability of normal packet data service or alternate data service. If normal packet data service is indicated, process flow proceeds to block 706. If alternate data service is indicated, process flow proceeds to block 716.

If normal packet data service has been indicated and process flow has proceeded to block 706, relay node 404 sends a registration acknowledgment to mobile communication device 116 and process flow proceeds to block 708, where the relay node 404 will communicate with mobile communication device 116 via packet service. Process flow proceeds from block 708 to decision block 710, from which process flow proceeds depending on whether an acknowledgment has been received from mobile communication device 116. If an acknowledgment has been received, process flow returns to block 708, where packet data communication continues. If an acknowledgment has not been received, process flow proceeds to block 712, where traffic is held, and then to block 714, wherein relay node 404 implements an appropriate recovery routine in order to reestablish communication.

As noted above, if normal packet data has not been indicated by mobile communication device 116, process flow proceeds to block 716, wherein an alternate data registration message is received. An alternate data registration acknowledgment is sent in block 718. Mobile communication device 116 is configured for alternate data service in block 720. Process flow proceeds from block 724 depending on whether an acknowledgment has been received from mobile communication device 116. If an acknowledgment has been received, process flow returns to block 722 and alternate data service continues. If an acknowledgment has not been received, process flow proceeds to block 726, in which traffic is held, and then to block 728, wherein relay node 404 implements a recovery routine.

It is believed that the operation and construction of the embodiments of the present disclosure will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method, operable on a mobile communication device, of provisioning data service for use by the mobile communication device, the method comprising:
   identifying an accessible wireless network;
   determining whether a packet data service is available via the wireless network;
   if the packet data service is unavailable via the wireless network, sending an alternate data registration message to a relay node via an Unstructured Supplementary Services Data (USSD) network, the alternate data registration message indicating that the packet data service is currently unavailable, and configuring the mobile communication device for alternate data service via the USSD network and the wireless network;
   if the packet data service becomes available via the wireless network while the mobile communication device is configured for alternate data service, sending a packet data registration message to the relay node via the packet data service and configuring the mobile communication device for packet data service; and
   modifying data transfer characteristics depending on whether communication is occurring via packet data service or via alternate data service.

2. The method of provisioning data service as recited in claim 1 further comprising if packet data service is available, sending a packet data registration message to the relay node and configuring the mobile communication device for packet data service.

3. The method of provisioning data service as recited in claim 1 further comprising the step of gathering operating statistics relating to usage of packet data service and alternate data service.

4. A system for provisioning data service with respect to a mobile communication device (MCD), the system comprising:
   means for determining whether a packet data service is available to the mobile communication device via a wireless network discovered in a location area;
   means, operable when the packet data service is unavailable via the wireless network, for sending an alternate data registration message to a relay node via an Unstructured Supplementary Services Data network, the alternate data registration message containing an indication that the packet data service is currently unavailable, and for configuring the mobile communication device for alternate data service via the USSD network and the wireless network;
   means, operable if the packet data service become available via the wireless network while the mobile communication device is configured for alternate data service, for sending a packet data registration message to the relay node via the packet data service and for configuring the mobile communication device for packet data service; and
   means for modifying data transfer characteristics depending on whether communication is occurring via packet data service or via alternate data service.

5. The system for provisioning data service as recited in claim 4 further comprising means, operable if packet data service is available via the wireless network, for sending a packet data registration message to the relay node and configuring the mobile communication device for packet data service.

6. The system for provisioning data service as recited in claim 4 further comprising means for gathering operating statistics relating to usage of packet data service and alternate data service.

7. A mobile communication device comprising:
   a processor operably coupled to a communication subsystem and a memory;
   a module operable to identify a wireless network accessible by the mobile communication device;
   a module operable to determine whether a packet data service is available to the mobile communication device via the wireless network; and
   a module operable, when the packet data service is unavailable to the mobile communication device via the wireless network, to send an alternate data registration message to a relay node via an Unstructured Supplementary Services Data network, the alternate data registration message indicating that the packet data service is currently unavailable, and to configure the mobile communication device for alternate data service via the USSD network and the wireless network;
   if the packet data service becomes available via the wireless network while the mobile communication device is configured for alternate data service, sending a packet data registration message to the relay node via the packet data; and
   a module for modifying data transfer characteristics depending on whether communication is occurring via packet data service or via alternate data service.

8. The mobile communication device as recited in claim 7 further comprising a module for sending a packet data registration message to the relay node if packet data service is available via the wireless network.

9. The mobile communication device as recited in claim 7 further comprising a module for actuating a user's selection between packet data service and alternate data service.

10. The mobile communication device as recited in claim 7 further comprising a module for gathering operating statistics relating to usage of packet data service and alternate data service.

11. The method of provisioning data service as recited in claim 2 further comprising performing communication with the relay node via packet data service responsive to sending a packet data registration message to the relay node and receiving a packet data registration acknowledgement.

12. The method of provisioning data service as recited in claim 1 further comprising performing communication with the relay node via alternate data service responsive to sending an alternate data registration message to the relay node and receiving an alternate data registration acknowledgement.

13. The system for provisioning data service as recited in claim 5 further comprising means for performing communication with the relay node via packet data service responsive to sending a packet data registration message to the relay node and receiving a packet data registration acknowledgement.

14. The system for provisioning data service as recited in claim 4 further comprising means for performing communication with the relay node via alternate data service responsive to sending an alternate data registration message to the relay node and receiving an alternate data registration acknowledgement.

15. The mobile communication device as recited in claim 8 further comprising logic for performing communication with the relay node via packet data service responsive to sending a packet data registration message to the relay node and receiving a packet data registration acknowledgement.

16. The mobile communication device as recited in claim 7 further comprising logic for performing communication with the relay node via alternate data service responsive to sending an alternate data registration message to the relay node and receiving an alternate data registration acknowledgement.

\* \* \* \* \*

UNITED STATES PATENT AND TRADEMARK OFFICE
CERTIFICATE OF CORRECTION

| | | |
|---|---|---|
| PATENT NO. | : 8,249,628 B2 | Page 1 of 1 |
| APPLICATION NO. | : 11/593436 | |
| DATED | : August 21, 2012 | |
| INVENTOR(S) | : Geroge Baldwin Bumiller | |

It is certified that error appears in the above-identified patent and that said Letters Patent is hereby corrected as shown below:

Column 10, Claim 7
Line 54, "packet data service or via alternate data service." should read --packet data service or via alternate data service;
  wherein the modules comprise one of hardware, firmware and software stored in the memory.--.

Signed and Sealed this
Sixteenth Day of October, 2012

David J. Kappos
*Director of the United States Patent and Trademark Office*